United States Patent [19]

Homme

[11] Patent Number: 5,178,239

[45] Date of Patent: Jan. 12, 1993

[54] SHOCK ABSORBER

[75] Inventor: Steven O. Homme, Goodridge, Minn.

[73] Assignee: Ride On, Inc., Thief River Falls, Minn.

[21] Appl. No.: 641,295

[22] Filed: Jan. 15, 1991

[51] Int. Cl.$^5$ ............................ F16F 9/42; F16F 9/43; F16F 9/48

[52] U.S. Cl. .................... 188/315; 188/274; 188/287; 188/322.19; 188/322.21; 267/64.28; 267/126

[58] Field of Search ............. 188/274, 322.19, 322.21, 188/286, 287, 314, 315; 267/64.28, 118, 126

[56] References Cited

U.S. PATENT DOCUMENTS

| | | | |
|---|---|---|---|
| 2,774,446 | 12/1956 | De Carbon | 188/314 X |
| 4,485,900 | 12/1984 | Kato et al. | 188/322.15 X |
| 4,742,898 | 5/1988 | Lee | 188/315 |
| 4,744,444 | 5/1988 | Gillingham | 188/315 |
| 4,838,392 | 6/1989 | Miller et al. | 188/286 X |
| 5,040,645 | 8/1991 | Stefan et al. | 188/287 |

FOREIGN PATENT DOCUMENTS

| | | | |
|---|---|---|---|
| 154395 | 1/1953 | Australia | 188/274 |
| 229089 | 8/1963 | Austria | 188/315 |
| 1650086 | 8/1970 | Fed. Rep. of Germany | 188/315 |
| 1150431 | 1/1958 | France | 188/315 |
| 813022 | 5/1959 | United Kingdom | 188/314 |

Primary Examiner—George E. A. Halvosa
Attorney, Agent, or Firm—Jerold M. Forsberg

[57] ABSTRACT

A shock absorber includes an extruded reservoir housing and a sleeve with position valving therein. The shock absorber coordinates the position valving and valving in the piston assembly in a manner such that the position of the piston assembly relative to the position valving becomes a factor in determining changes in valving.

21 Claims, 3 Drawing Sheets

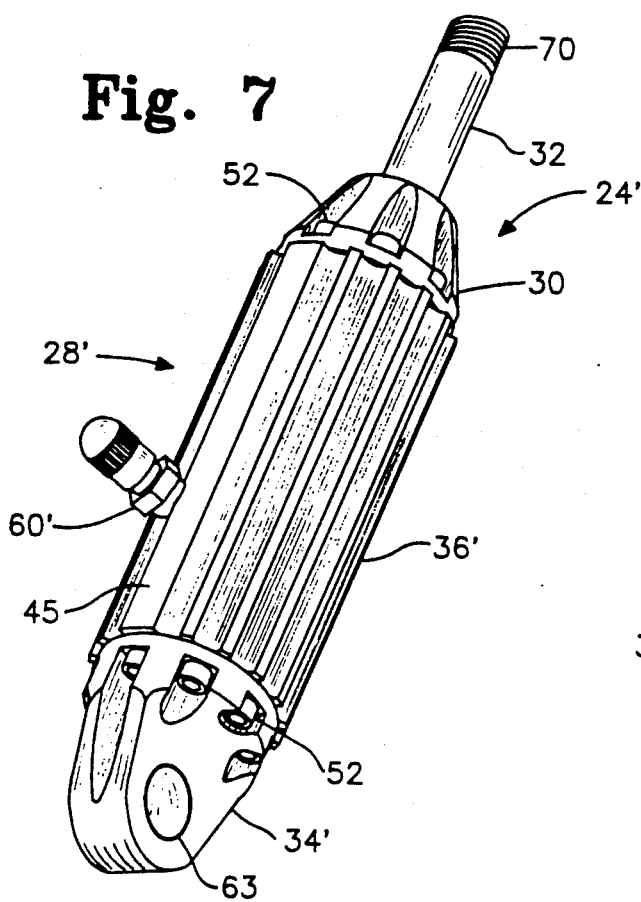
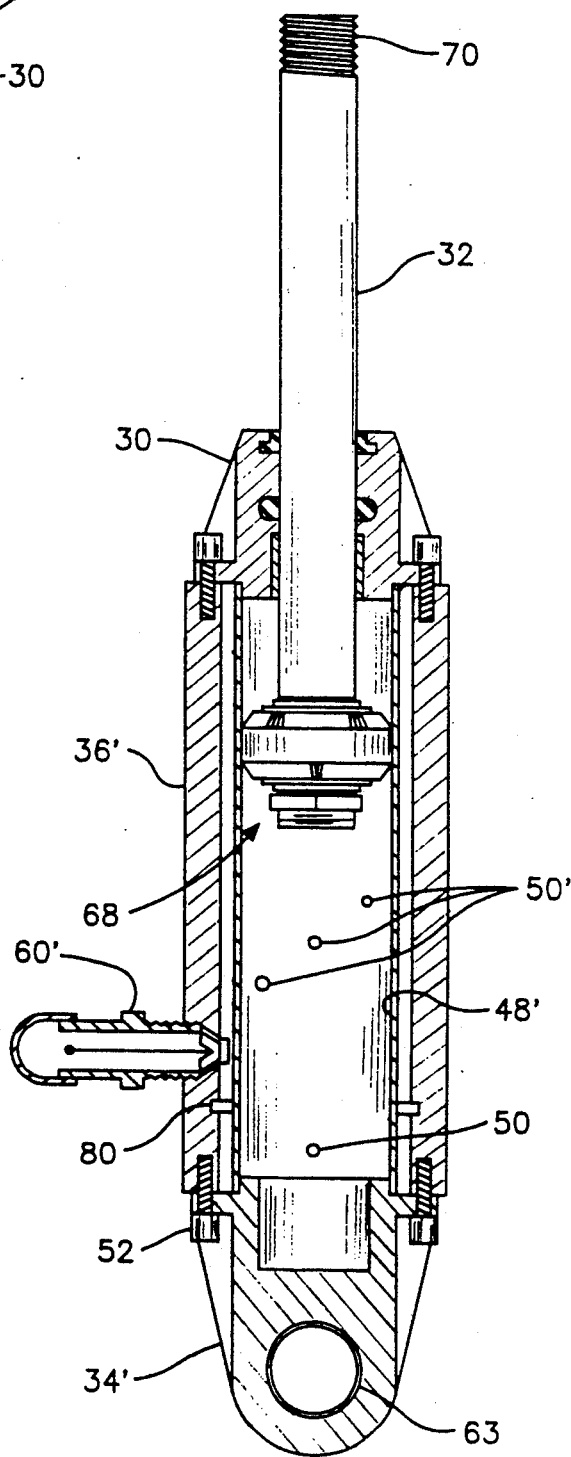

SHOCK ABSORBER

BACKGROUND OF THE INVENTION

The present invention relates generally to an improved shock absorber arrangement, and more specifically to a shock absorber that coordinates valving in a cylinder assembly with valving in a piston assembly and has a cylinder assembly which includes an extruded reservoir housing and a pressed in sleeve.

Standard shock absorbers are currently controlled by high velocity control valves and low velocity valve ports disposed in the piston. The low velocity valve ports are simply holes through the piston with the degree of control being determined by the size and number of the holes in the piston. High velocity control is accomplished by holes in the piston being controlled by spring washers. When velocity of fluid in front of the piston increases to a point where the fluid can not pass through the low velocity ports at a sufficient rate pressure will build to a point where the pressure exerted by the spring washers is overcome and they are forced to open thereby permitting fluid to pass through the high velocity control valves. The amount of tension in the spring washers determines the amount of restriction to the high velocity flow and thus how much energy is absorbed. To change the energy absorption rate of standard shock absorbers requires a change in the size and/or the number of the ports in the piston and a change in the size and/or the number of spring washers used.

The most significant problem with standard shock absorbers is that they only sense velocity no matter how far the piston has moved within the shock absorber. Therefore, a small bump hit at high speed will create a velocity which will cause the shock absorber to use the high speed control valves thereby resulting in a harsh ride for the user even though the terrain is generally level except for small bumps. This situation can not be corrected by simply enlarging the low velocity control ports because if too much fluid is permitted to pass through the low velocity ports there will not be enough left to keep the shock absorber from bottoming out, e.g., when the shock absorber responds to a small bump immediately followed by a much larger bump.

Shock absorbers are generally well known and various approaches have been taken to improve the manner in which they operate as well as the ease with which they are manufactured. An early tube-type shock absorber, U.S. Pat. No. 1,571,788, shows the use of external compartments with valves therebetween for controlling fluid flow from one side of the piston to the other. Another shock absorber, U.S. Pat. No. 2,360,755, teaches two stage shock absorption and includes a surrounding reserve chamber. U.S. Pat. No. 3,213,973 teaches the concept of one tube within another tube wherein the inner tube has two sets of ports and separate passageways for each set of ports. Yet another shock absorber, U.S. Pat. No. 2,410,176, incorporates an end cap with a valve for pressurizing the shock. U.S. Pat. No. 3,226,103 shows a shock absorber having an inflatable bladder and a fluid chamber surrounding a tubular member containing the piston assembly. Another shock absorber with an inflatable bladder is shown in U.S. Pat. No. 4,700,815.

None of the shock absorbers currently available in the market or found in the prior art patents approaches the invention as disclosed and claimed herein.

SUMMARY OF THE INVENTION

According to the present invention a shock absorber arrangement provides for controlling velocities within the shock absorber by routing fluid through position valving in a sleeve received within an extruded reservoir housing in addition to utilizing a piston assembly which includes controlled valves in the head thereof. The extruded housing cooperates with the pressed in sleeve to provide passageways for routing fluid from one side of the piston assembly to the other. The position and size of ports in the sleeve, used for position valving, and the sizes of the ports and spring washers in the piston assembly, used for high velocity valving, are predetermined so as to cooperate to produce different ride characteristics depending on the position of the piston assembly relative to the position valving in the sleeve. Accordingly, smaller amounts of resistance inhibit fluid flow until the piston assembly passes and closes off the ports of the position valving at which time a greater amount of resistance is encountered due to the resistance created by spring washers controlling the ports in the piston assembly.

It is an object of the present invention to provide a shock absorber that includes a cylinder assembly which has an extruded reservoir housing and a pressed in sleeve.

It is another object of the invention to provide a shock absorber which has softer ride characteristics when there are small amounts of piston travel even though there may be higher relative velocities.

It is yet another object of the invention to provide a shock absorber wherein the position of the piston assembly relative to the cylinder assembly becomes a factor in determining changes in valving.

Accordingly, it is an object of this invention to provide a shock absorber which overcomes the problems of the prior art and which is inexpensive to manufacture.

Other objects and advantages of the present invention will be apparent and understood from the following detailed description when taken in conjunction with the accompanying drawings.

BRIEF DESCRIPTION OF THE DRAWINGS

In the accompanying drawings:

FIG. 7 is a perspective view of another embodiment of the shock absorber constructed in accordance with the instant invention;

FIG. 8 is a cross-sectional view showing the piston assembly relative to a cross section of the body of the shock absorber depicted in FIG. 6; and FIG. 9 is a perspective view of another embodiment of the sleeve.

DETAILED DESCRIPTION OF THE PREFERRED EMBODIMENTS

Figure 1:
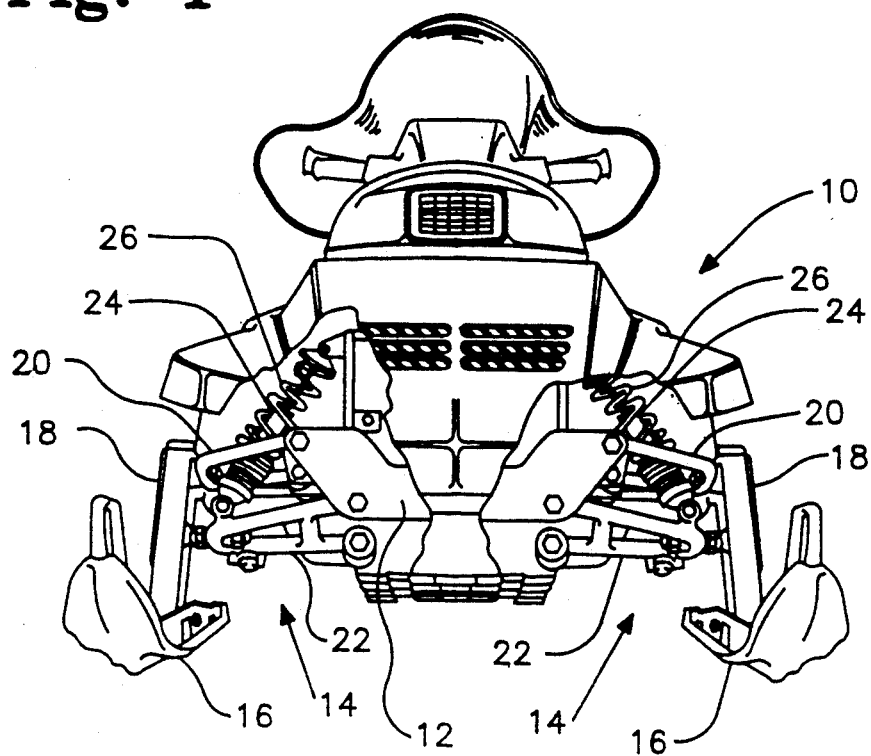
FIG. 1 is a front view of a snowmobile having a suspension system utilizing a pair of shock absorbers constructed in accordance with the instant invention.

It should be noted that like reference numerals have been employed to designate the same or similar components throughout the various views.

Referring now to FIG. 1, a snowmobile 10 is shown as having a chassis 12 with front suspension 14 for the attachment of a pair of skis 16 thereto. Front suspension 14 includes the chassis 12, spindle arrangements 18, upper A-frames 20, lower A-frames 22, and a pair of shock absorbers 24 constructed in accordance with the instant invention. The shock absorbers 24 are shown with coiled springs 26 mounted thereto.

Figure 2:
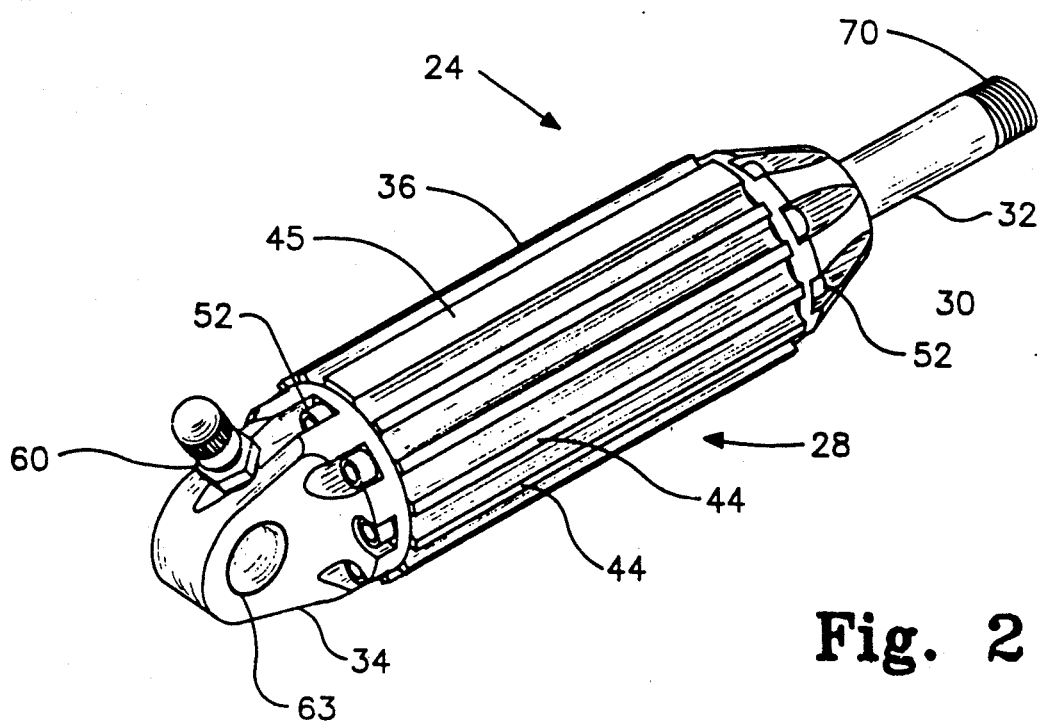
FIG. 2 is a perspective view of a shock absorber constructed in accordance with the instant invention.

Each shock absorber 24 (best seen in FIG. 2) includes a cylinder assembly 28, an end cap 30 through which piston rod 32 extends, and an end cap 34.

Figure 3:
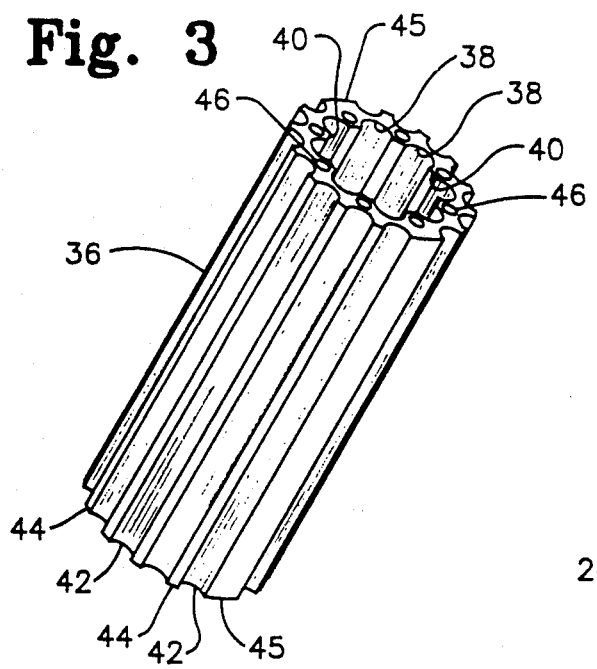
FIG. 3 is a perspective view of the extruded reservoir housing of the cylinder assembly.
Figure 4:
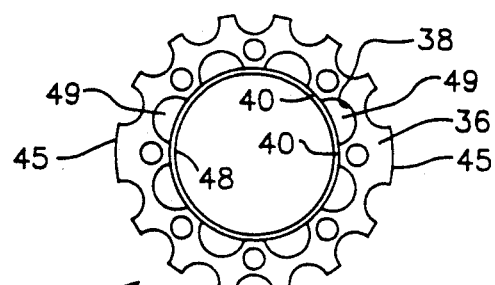
FIG. 4 is an end view of the cylinder assembly.
Figure 5:
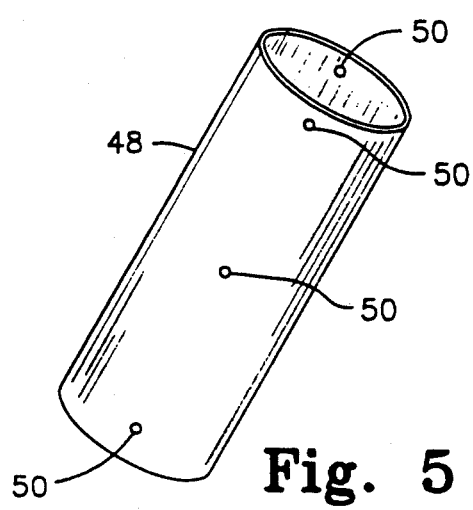
FIG. 5 is a perspective view of one embodiment of the sleeve.

Cylinder assembly 28 includes a reservoir housing 36 (see FIGS. 3 and 4) having alternating longitudinally extending channels 38 and ribs 40 on its interior surface and a plurality of alternating channels 42 and fins 44 on its exterior surface. Both ends of reservoir housing 36 have threaded bores 46 for the attachment of the end caps 30 and 34. Reservoir housing 36 is preferably extruded of a light weight material such as aluminum or an aluminum alloy and is dimensioned such that a sleeve 48 (see FIGS. 4 and 5), of a predetermined diameter, will fit inside of the reservoir housing 36 with ribs 40 engaging the exterior surface of sleeve 48 and supporting the sleeve 48 in a manner resisting deformation. It has been found that the extruded housing 36 has greater strength if the channels 38 are disposed relative to channels 42 as shown in FIG. 4 and the threaded bores 46 are positioned so as to maximize the amount of material therearound. Each channel 38 with ribs 40 on either side thereof cooperates with the exterior of the sleeve to form individual passageways 49.

Prior to sleeve 48 being pressed into reservoir housing 36, the reservoir housing 36 and the sleeve 48 are cut to predetermined lengths and position valving in the form of ports 50, for controlling fluid flow, are punched or drilled at predetermined locations in the sleeve. In the embodiment of the sleeve depicted in FIGS. 5 and 6, there is a series of three ports 50 aligned longitudinally along sleeve 48, one near the top end, one near the middle, and one near the bottom, and additional holes 50 diametrically opposed to each of the top and middle holes. When the sleeve 48 is pressed into reservoir housing 36, each port of the series of three ports is aligned with one of the passageways 49 and the two diametrically opposed ports are each aligned with other passageways 49.

Figure 6:
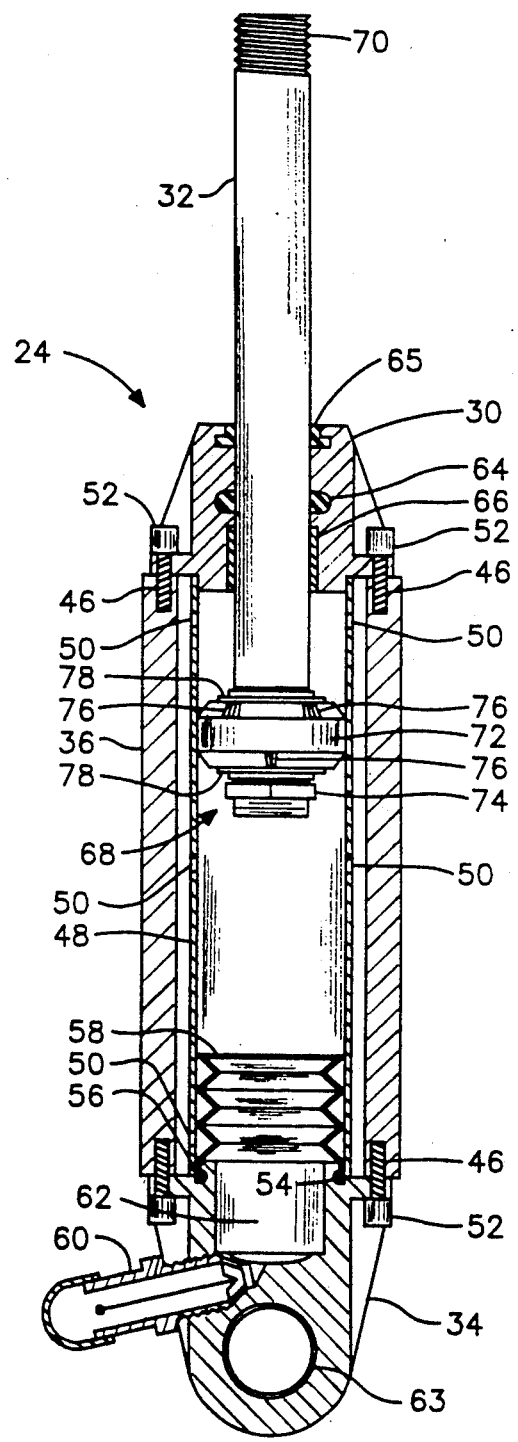
FIG. 6 is a cross-sectional view showing the piston assembly relative to a cross section of the body of the shock absorber as shown in FIG. 1.

Referring now to FIG. 6, end cap 34 is secured to one end of cylinder assembly 28 by bolts 52 cooperating with threaded bores 46. End cap 34 includes an annular groove 54 for receiving an enlarged rim 56 of a bladder 58. Bladder 58 is sized to fit within the end of sleeve 48 and is installed within sleeve 48 with the enlarged rim 56 received in the annular groove 54 when the end cap 34 is affixed to the end of the cylinder assembly such that the bladder is fixedly positioned in a sealed manner relative to the end cap. A valve 60 in end cap 34 is connected to the interior of bladder 58 by a vent 62 whereby the pressure within the bladder can be selectively controlled by the addition thereto or release therefrom of compressed air. End cap 34 also includes a transverse bore 63, or the like, for attachment of the end of shock absorber 24, defined by end cap 34, to a suspension system.

End cap 30 includes at least one seal 64 along with a seal 65 for sealing around piston rod 32 and a bushing 66 for guiding piston rod 32 as it recirpocates relative to the end cap. End cap 30 is attached to an opposite end of the cylinder assembly 28 from end cap 34 by bolts 52 cooperating with threaded bores 46. Any of a number of common sealants may be used with end caps 30 and 34 to seal the ends of cylinder assembly 28, e.g. silicone sealant.

Piston rod 32 includes a piston assembly 68 at a first end and a means for attachment to the suspension system at a second end. The means for attachment on the second end may include threads 70 which can be directly attached to the suspension system or to which an adapter can be attached such that the shock absorber can be used with suspension systems which have other types of mounting means for shock absorbers. Piston assembly 68 includes a piston 72 attached to the end of piston rod 32 by conventional means such as a nut 74 cooperating with threads on rod 32. Piston 72 includes conventional means such as a seal (not shown) for sealing against an interior surface of sleeve 48, as it reciprocates therein and ports 76 controlled by valve spring washers 78. Valve spring washers 78 are stacked on both sides of piston 72 and cooperate with ports 76 in a conventional manner such that when predetermined pressures are reached either on the compression stroke or on the rebound stroke fluid will cause the respective valve springs 78 to open thereby permitting fluid to pass through selected ones of the ports. It being understood that some of ports 78 are controlled for the compression stroke and some of the ports 76 are controlled for the rebound stroke.

Referring now to FIG. 6, it should be noted that the coiled spring 26 (not shown in FIG. 6) acts to extend the length of shock absorber 24 thereby biasing the arrangement such that piston 72 tends to be at rest proximate the upper end of cylinder assembly 28. The position ports 50 are disposed in sleeve 48 such that at least one of the ports is disposed midway along the length of the cylinder assembly (in the embodiment of FIG. 6 there are two midway position ports) thereby providing a predetermined amount of resistance to fluid attempting to pass therethrough whereby a softer ride results when the piston is reciprocating between the ports disposed near the upper end of the cylinder assembly 28 and the port(s) disposed midway along the sleeve. Once piston 72 passes the midway port(s) the pressure of the fluid within sleeve 48 in front of piston 72 will build rapidly as the piston continues to move toward end cap 34 thereby causing the valve spring washers on the top of the piston to open and permit fluid to flow through the ports to the other side of the piston. When the shock absorber is in a rebound condition the valve spring washers on the bottom of piston 72 react in a conventional manner permitting fluid to flow through selected ports in the piston as the piston 72 returns to the upper end of sleeve 48. Accordingly, it is the position of piston 72 relative to the position port(s) disposed midway along the length of sleeve 48 which is now a factor in determining which valving is being used and whether a softer ride will result.

After the shock absorber in the embodiment of FIG. 6 has been fully assembled and charged with a nitrogen and oil emulsion it should be understood that the pressure can be varied in a conventional manner by increasing or decreasing the air pressure in bladder 58. In the embodiment depicted in FIG. 7 the pressure within shock absorber 24' can be changed by adding pressure directly to the fluid by way of valve 60' The shock absorber 24' of this embodiment operates in the same manner as the shock absorber 24 of the first embodiment with the difference in the two embodiments being that compressed air can be used to add pressure to the bladder 58 of the first embodiment while nitrogen or an emulsion of nitrogen and oil is ideally used to increase the pressure in the shock absorber 24' of the second embodiment. An emulsion of nitrogen and oil has been found to be the preferred substance used to fill and pressurize the shock absorber.

FIG. 8 shows another embodiment of the sleeve 48' wherein there are a plurality of ports 50' disposed midway along the length of the sleeve. The ports disposed midway are spaced along the length of the sleeve 48' at predetermined intervals such that piston 72 passes individual ports of the plurality sequentially wherein the build up of pressure in front of the piston is more gradual and not all at once. Each of the ports 50' of the plurality of ports is disposed midway along the length of the sleeve such that each port is aligned with a separate passageway 49. It should be noted that it is contemplated that all of the passageways 49 can be interconnected by way of a groove 80 or a series of grooves in the interior surface of the reservoir housing 36' thereby providing for better mixing of heated fluid and cool fluid thereby spreading the heated fluid around the inside of the reservoir housing. Fins 44 invite a better transference of heat through the reservoir housing by providing a larger amount of surface area for cooling, etc.. It should be noted that an adjacent pair of fins may have the channel therebetween eliminated with an extra wide rib 45 resulting. Ribs 45 present a surface which may be used for purposes of displaying identification or having information painted or engraved thereon.

It should be understood that it is contemplated that shock absorbers constructed in accordance with the instant invention can be used in any environment where shock absorbers are needed, e.g., on snowmobiles, motorcycles, automobiles, etc.. The requirements of different environments may include that cylinder assemblies be of larger diameters and/or longer lengths and that the ports of the position valving may need to vary in size, number, and position to achieve the ride as contemplated by the concept disclosed herein.

While this invention has been described with a certain degree of particularity, it is manifest that many changes may be made in the details of construction and in the arrangement of components without departing from the spirit and scope of the disclosure. It is understood that the invention is not limited to the embodiments set forth herein for purposes of exemplification, but is limited only by the scope of the attached claims, including the full range of equivalency to which each element thereof is entitled.

What is claimed is:

1. A shock damping apparatus for damping relative motion of interconnected elements of a vehicle comprising:
    a cylinder assembly including reservoir means and sleeve means;
    piston means including rod means having a piston assembly at one end and means at a second end for connection to said vehicle, said piston assembly being slidably received within said sleeve means dividing said sleeve means into a compression chamber and a rebound chamber;
    first end cap means slidably receiving said rod means therethrough attached to a first end of said cylinder assembly, said first end cap means sealing said first end of said cylinder assembly and sealing around said rod means; and
    second end cap means attached to a second end of said cylinder assembly including means for sealing said second end of said cylinder assembly and means for connection of said second end cap means to said vehicle;
    said reservoir means including a plurality of longitudinally extending ribs on an interior surface extending from said first end to said second end, said sleeve means being of a predetermined diameter such that when the sleeve means is disposed within said reservoir means more than one of said plurality of ribs directly contacts and supports said sleeve means.

2. A shock damping apparatus as set forth in claim 1 wherein said sleeve means includes position valving disposed along the length thereof.

3. A shock damping apparatus as set forth in claim 2, wherein said piston assembly includes a piston head having valving means therein.

4. A shock damping apparatus as set forth in claim 3 wherein said position valving in said sleeve means includes a plurality of ports of predetermined sizes disposed at predetermined locations for controlling fluid flow such that the flow of fluid being compressed by relatively shorter amounts of travel of the piston assembly within the sleeve means is generally accommodated by said position valving.

5. A shock damping apparatus as set forth in claim 4 wherein said valving means in said piston head includes ports controlled by spring washers.

6. A shock damping apparatus as set forth in claim 5 wherein said valving means in said piston head includes a plurality of springs on either side of the piston head for controlling fluid flow as the piston assembly reciprocates within the sleeve means.

7. A shock damping apparatus as set forth in claim 1 wherein said reservoir means includes an extruded reservoir housing having longitudinally extending fins for cooling on an exterior surface and longitudinally extending channels alternating with said longitudinally extending ribs on the interior surface, each of said channels cooperating with a rib disposed on either side thereof and an outer surface of said sleeve means to form a passageway.

8. A shock damping apparatus as set forth in claim 7 wherein said first and second end cap means are removably attached to said cylinder means by threaded fasteners engaging threaded bores in said extruded reservoir housing.

9. A shock damping apparatus as set forth in claim 8 wherein said second end cap means includes an annular groove and an inlet controlled by a valve and said sleeve means includes a bladder means disposed therein secured proximate said second end cap means by an enlarged rim on said bladder means being received in said annular groove such that said bladder means is in communication with said inlet and can be pressurized by way of said valve.

10. A shock damping apparatus as set forth in claim 7 wherein said alternating ribs and channels on the interior surface of said reservoir housing form multiple passageways and all of said ribs support said sleeve means, said sleeve means including position valving having at least three ports communicating with at least one passageway of said multiple passageways.

11. A shock damping apparatus as set forth in claim 10 wherein said position valving in said sleeve means includes at least three ports with each port communicating with a different passageway of said multiple passageways.

12. A shock damping apparatus as set forth in claim 11 wherein the at least three ports communicating with different passageways are of varying predetermined sizes and disposed at different locations along the length of the sleeve means such that the stiffness of the shock increases progressively as the piston assembly passes each of teh at least three ports sequentially.

13. A shock damping apparatus as set forth in claim 10 wherein said extruded reservoir housing includes means for interconnecting said multiple passageways.

14. A shock damping apparatus as set forth in claim 13 wherein said means interconnecting the multiple passageways includes at least one circumferential groove on the inside of the extruded reservoir housing thereby creating a common reservoir of said multiple passageways.

15. A shock damping apparatus as set forth in claim 7 wherein said means at said second end of said rod means includes a first stop means for engaging and positioning one end of a spring and said extruded reservoir housing includes a second stop means disposed on the exterior thereof for engaging and positioning a second end of said spring, said spring being designed to encircle and cooperate with said shock dampening apparatus as a component of a suspension system for a vehicle.

16. A shock damping apparatus as set forth in claim 7 wherein a wide rib is provided on the exterior of said extruded housing which can be engraved and painted for presenting information.

17. A shock damping apparatus as set forth in claim 1 wherein said reservoir means of said cylinder assembly includes a valve disposed along the length thereof for adjusting the fluid pressure within the shock dampening apparatus.

18. A shock damping apparatus as set forth in claim 17 wherein saic shock dampening apparatus is filled with an oil and nitrogen emulsion.

19. A process for manufacturing a shock damping apparatus including the steps of:
   extruding a reservoir housing having a plurality of ribs and channels extending generally from a first end to a second end on an interior surface thereof and cooling fins on an exterior surface;
   cutting the reservoir housing to a predetermined length;
   pressing a sleeve of a predetermined length into said reservoir housing wherein more than one of said ribs directly contacts and supports said sleeve;
   inserting a piston assembly with attached piston rod into said sleeve;
   fastening a first removable end cap to one end of said reservoir housing in a manner sealing said one end of said reservoir housing with said piston rod being slidably received therethrough;
   fastening a second removable end cap to a second end of said reservoir housing in a manner sealing said second end of said reservoir housing; and
   filling and pressurizing said shock damping apparatus with an oil and gas emulsion.

20. A process for manufacturing a shock damping apparatus as set forth in claim 19 wherein the steps of fastening the first and second end caps includes the step of threading bores for a plurality of bolts in said extruded reservoir housing.

21. A cylinder assembly for a shock damping apapratus comprising reservoir housing means having longitudinally extending fins on an exterior surface and a plurality of longitudinally extending ribs and channels extending generally from a first end to a second end of an interior surface thereof and a generally cylindrical sleeve means of a predetermined diameter disposed within said reservoir housing wherein more than one of said ribs directly contacts and supports said sleeve means and said ribs and said channels cooperate with an exterior surface of said sleeve means to form at least one passageway.

* * * * *